United States Patent
Kadobayashi

(10) Patent No.: US 9,141,891 B2
(45) Date of Patent: Sep. 22, 2015

(54) JOB MANAGEMENT DEVICE

(71) Applicant: KYOCERA Document Solutions Inc., Osaka (JP)

(72) Inventor: Izumi Kadobayashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/564,397

(22) Filed: Dec. 9, 2014

(65) Prior Publication Data
US 2015/0178600 A1 Jun. 25, 2015

(30) Foreign Application Priority Data
Dec. 24, 2013 (JP) ................. 2013-265295

(51) Int. Cl.
G06K 15/00 (2006.01)
G06K 15/02 (2006.01)
G06F 3/12 (2006.01)

(52) U.S. Cl.
CPC ........ *G06K 15/1806* (2013.01); *G06K 15/4095* (2013.01)

(58) Field of Classification Search
None
See application file for complete search history.

(56) References Cited

U.S. PATENT DOCUMENTS 7,864,354 B2 * 1/2011 Shahindoust et al. ....... 358/1.15
2005/0243363 A1 * 11/2005 Muto .......................... 358/1.15

FOREIGN PATENT DOCUMENTS

| JP | 07-261950 | 10/1995 |
| JP | 10-187401 | 7/1998 |
| JP | 2000-089923 | 3/2000 |

\* cited by examiner

*Primary Examiner* — Dov Popovici
(74) *Attorney, Agent, or Firm* — Wenderoth, Lind & Ponack, L.L.P.

(57) ABSTRACT

A job management device includes a display unit, an authenticating unit and a job display processing unit. The display unit displays information. The authenticating unit determines whether a user is previously authorized to use an image forming apparatus. The job display processing unit executes a job display processing by which the contents of print jobs to under execution and prior to execution among print jobs accepted by the image forming apparatus are arranged in an execution order and displayed on the display unit, the job display processing unit configured to, in the job display processing, identifiably display the contents of a print job inputted by an authenticated user who is determined by the authenticating unit to have prior authorization to use the image forming apparatus and unidentifiably display the contents of the print jobs inputted by users other than the authenticated user.

8 Claims, 12 Drawing Sheets

US 9,141,891 B2

JOB MANAGEMENT DEVICE

CROSS-REFERENCE TO RELATED APPLICATION(S)

This application is based upon and claims the benefit of priority from Japanese Patent Application No. 2013-265295 filed on Dec. 24, 2013, the entire contents of which are incorporated herein by reference.

BACKGROUND

The technology of the present disclosure relates to a job management device which displays the contents of a print job.

In the related art, there is known, e.g., a technology in which the contents of a print job accepted by an image forming apparatus or the execution status of a print job are displayed on a display unit of the image forming apparatus or a display unit of an external device. In this technology, for example, a user name (owner name) of a user who has inputted a print job, a thumbnail image (preview image) indicating a print target image, a print target document name, and the like are displayed as the contents of a print job.

SUMMARY

A job management device according to one aspect of the present disclosure includes a display unit, an authenticating unit and a job display processing unit. The display unit 31 is configured to display information. The authenticating unit is configured to determine whether a user is previously authorized to use an image forming apparatus. The job display processing unit is configured to execute a job display processing by which the contents of print jobs under execution and prior to execution among print jobs accepted by the image forming apparatus are arranged in an execution order and displayed on the display unit, the job display processing unit configured to, in the job display processing, identifiably display the contents of the print job inputted by an authenticated user who is determined by the authenticating unit to have prior authorization to use the image forming apparatus and unidentifiably display the contents of the print jobs inputted by users other than the authenticated user.

DETAILED DESCRIPTION

Figure 1:
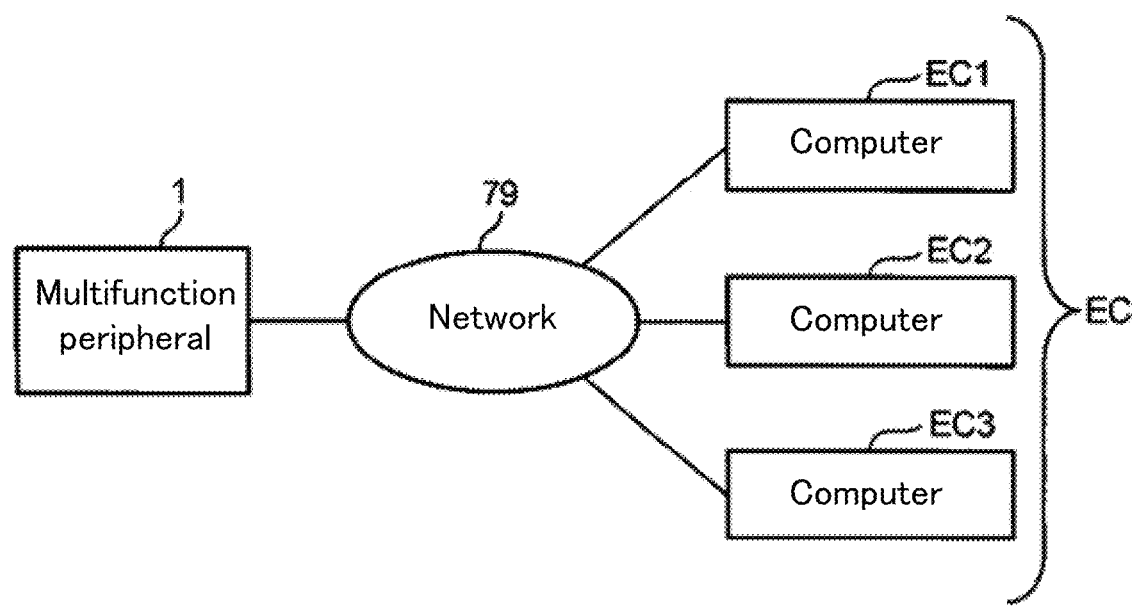
FIG. 1 is a view showing a connection relationship between a multifunction peripheral, which is one example of a job management device and an image forming apparatus according to the present embodiment, and a computer.

An embodiment of the present disclosure will now be described in detail with reference to the accompanying drawings. FIG. 1 is a view showing a connection relationship between a multifunction peripheral 1, which is one example of a job management device and an image forming apparatus according to the present embodiment, and a computer EC.

As shown in FIG. 1, the multifunction peripheral 1 is connected to a network 79 such as a LAN (Local Area Network) or the Internet. The multifunction peripheral 1 performs communication with a plurality of computers EC1 to EC3 such as personal computers or the like via the network 79. The number of the computers connected to the multifunction peripheral 1 via the network 79 is not limited to three but may be one, two or four or more. In the following description, the computers EC1 to EC3 will be generically referred to as a computer EC.

Figure 2:
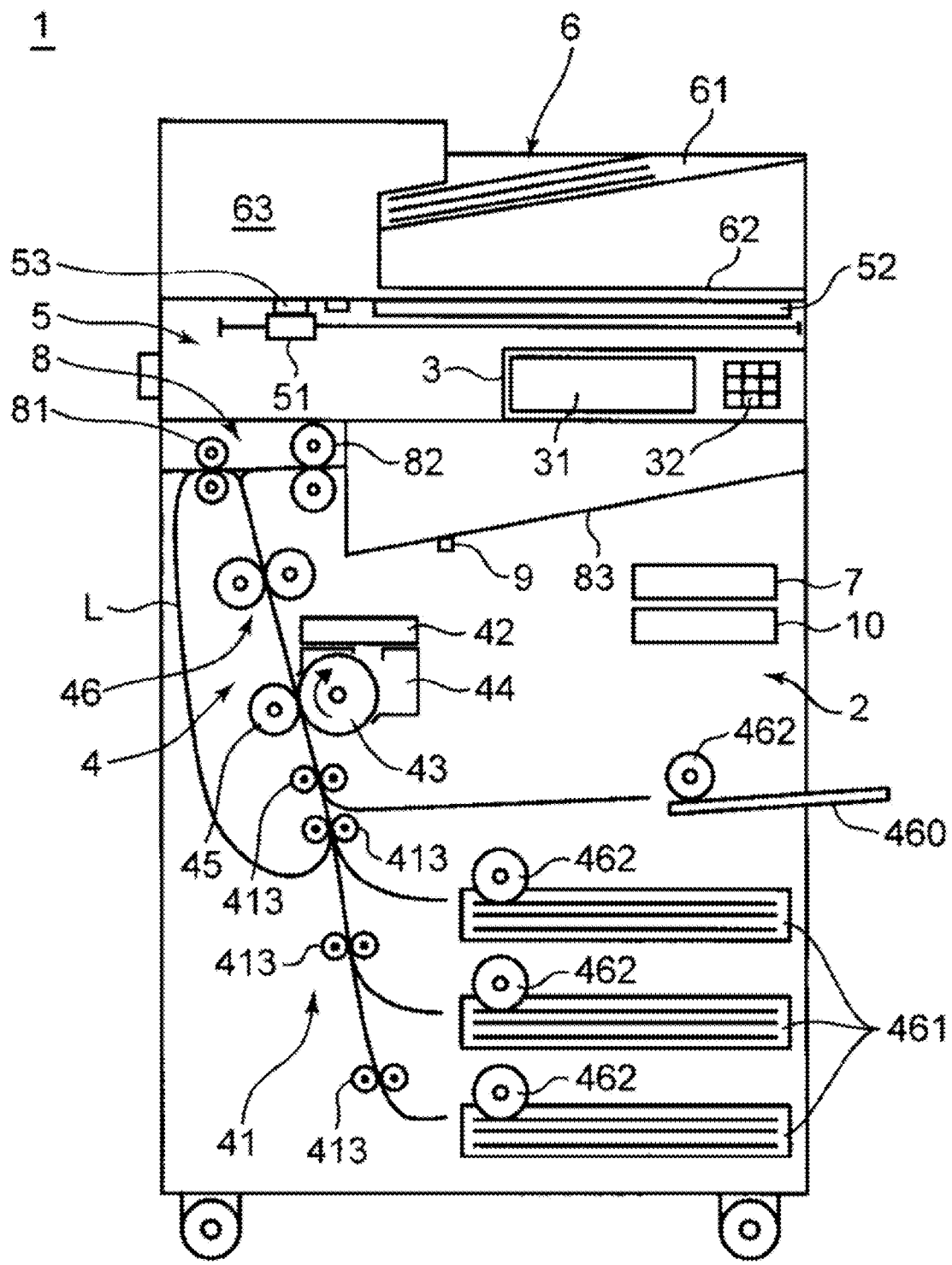
FIG. 2 is a schematic structural diagram of the multifunction peripheral.
Figure 3:
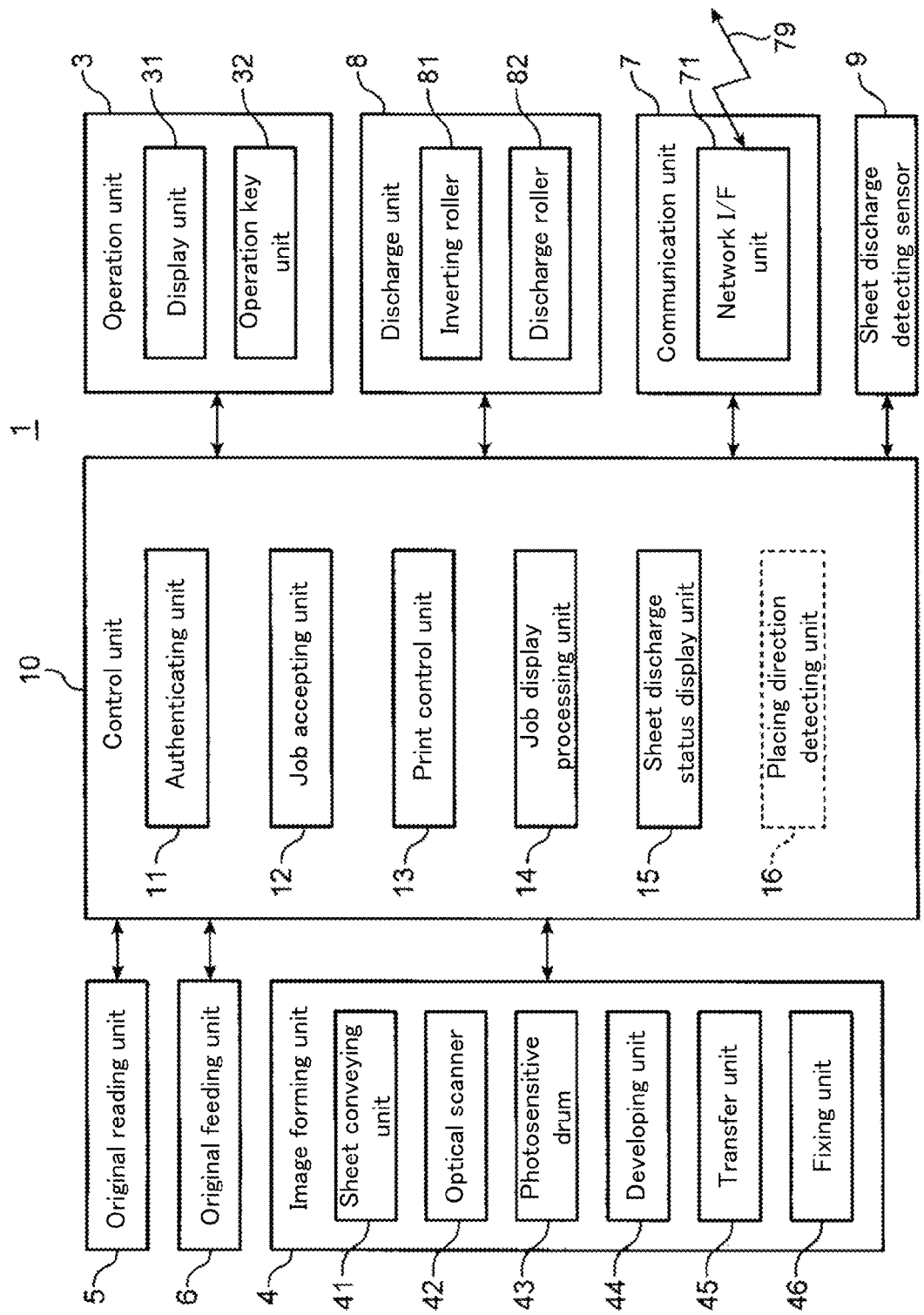
FIG. 3 is a block diagram showing an electric configuration of the multifunction peripheral.

FIG. 2 is a schematic structural diagram of the multifunction peripheral 1. FIG. 3 is a block diagram showing an electric configuration of the multifunction peripheral 1. Specifically, as shown in FIG. 2, the multifunction peripheral 1 includes an operation unit 3, a original reading unit 5, a original feeding unit 6 and a body unit 2.

The operation unit 3 includes a display unit 31 for displaying information and an operation key unit 32 for allowing a user to input different kinds of instructions. The display unit 31 is configured by, e.g., a liquid crystal display or the like which has a touch panel function. The operation key unit 32 includes various kinds of pad keys, e.g., a start key through which a user inputs a print execution instruction and numeric keys through which a user inputs the number of print copies or the like.

The original reading unit 5 includes a scanner unit 51, which is formed of an exposure lamp and a CCD (Charge Coupled Device), a original plate 52 made of a transparent material such as glass or the like, and a original reading slit 53.

The scanner unit 51 is configured so that it can be moved by a driving unit not shown. In case of reading a original placed on the original plate 52, the scanner unit 51 moves along a original surface at a position where the scanner unit 51 faces toward the original plate 52. The scanner unit 51 outputs an image data, which indicates an image read by the scanner unit 51 while scanning a original, to a control unit 10 to be described later.

On the other hand, in case of reading a original fed by the original feeding unit 6, the scanner unit 51 moves to a position where the scanner unit 51 faces toward the original reading slit 53. The scanner unit 51 reads an image of the original through the original reading slit 53 in synchronism with a original feeding operation performed by the original feeding unit 6 and outputs an image data, which indicates the image thus read, to a control unit 10 to be described later.

The original feeding unit 6 includes a original placing unit 61 on which originals are placed, a original discharge unit 62 to which the original whose image has been read by the scanner unit 51 is discharged, and a original conveying mechanism 63. The original conveying mechanism 63 feeds the originals placed on the original placing unit 61, one by one, and then discharges the original to the original discharge unit 62 via a position where the original faces toward the original reading slit 53.

The body unit 2 includes a manual insertion tray 460, a plurality of sheet feeding cassettes 461, a plurality of sheet feeding rollers 462, an image forming unit 4, a discharge unit 8, a communication unit 7, a sheet discharge detecting sensor (placing detection unit) 9 and a control unit 10.

The sheet feeding rollers 462 draw a sheet from the manual insertion tray 460 on which sheets are placed or each of the sheet feeding cassettes 461 which accommodate sheets, and conveys the sheet to the image forming unit 4.

The image forming unit 4 includes a sheet conveying unit 41, an optical scanner 42, a photosensitive drum 43, a developing unit 44, a transfer unit 45 and a fixing unit 46.

The sheet conveying unit 41 includes a plurality of conveying rollers 413. Each of the conveying rollers 413 supplies a sheet, which is conveyed by each of the sheet feeding rollers 462, to the photosensitive drum 43.

Under the control of the control unit 10, the optical scanner 42 outputs laser light based on the image data inputted to the control unit 10. The optical scanner 42 scans the photosensitive drum 43 with the laser light, eventually forming an electrostatic latent image on the photosensitive drum 43.

The developing unit 44 forms a toner image by affixing a toner to the electrostatic latent image formed on the photosensitive drum 43. The transfer unit 45 transfers the toner image on the photosensitive drum 43 to a sheet. The fixing unit 46 fixes the toner image to the sheet by heating the sheet to which the toner image is transferred.

The discharge unit 8 includes a discharge tray 83 to which the sheet having an image formed thereon is discharged, a discharge roller 82 and an inverting roller 81.

The discharge roller 82 discharges the sheet having an image formed by the image forming unit 4 to the discharge tray 83 in a face-down state in which the front side of the sheet faces downward. The front side of the sheet refers to the upper surface side of the sheet when the sheet is accommodated within each of the sheet feeding cassettes 461.

Alternatively, the discharge roller 82 may discharge the sheet to the discharge tray 83 in a face-up state in which the front side of the sheet faces upward. In case of discharging the sheet in the face-up state, the image forming unit 4 conveys the sheet to the inverting roller 81. Thereafter, the inverting roller 81 stops in such a state that the trailing end of the sheet is nipped by the inverting roller 81. Subsequently, the inverting roller 81 is inverted to switch back the nipped sheet toward the discharge roller 82. The discharge roller 82 discharges the sheet to the discharge tray 83 in a face-up state.

In case of forming images on the opposite surfaces of the sheet, the inverting roller 81 feeds the sheet to a sheet conveying path L without having to switch back the sheet and conveys the sheet to the upstream region of the image forming unit 4 again. Then, an image is formed on the rear surface of the sheet by the image forming unit 4. Thereafter, the discharge roller 82 discharges the sheet to the discharge tray in a face-up state in which the front side of the sheet 83 sent from the image forming unit 4 faces upward.

As shown in FIG. 3, the communication unit 7 includes a network I/F unit 71. The network I/F unit 71 is a communication interface circuit for making communication with the computer EC (see FIG. 1) connected to the network 79.

The sheet discharge detecting sensor 9 detects whether the sheet is placed on the discharge tray 83. The sheet discharge detecting sensor 9 is configured by, e.g., a reflection-type photo sensor which includes a light emitting element and a light receiving element. More specifically, it is assumed that the light emitted from the light emitting element is reflected by the sheet placed on the discharge tray 83 and is received by the light receiving element. In this case, the sheet discharge detecting sensor 9 outputs a detection signal, which indicates that the sheet is placed on the discharge tray 83, to the control unit 10. On the other hand, it is assumed that the light emitted from the light emitting element is not reflected and is not received by the light receiving element. In this case, the sheet discharge detecting sensor 9 outputs a detection signal, which indicates that the sheet is not placed on the discharge tray 83, to the control unit 10.

Figure 4:
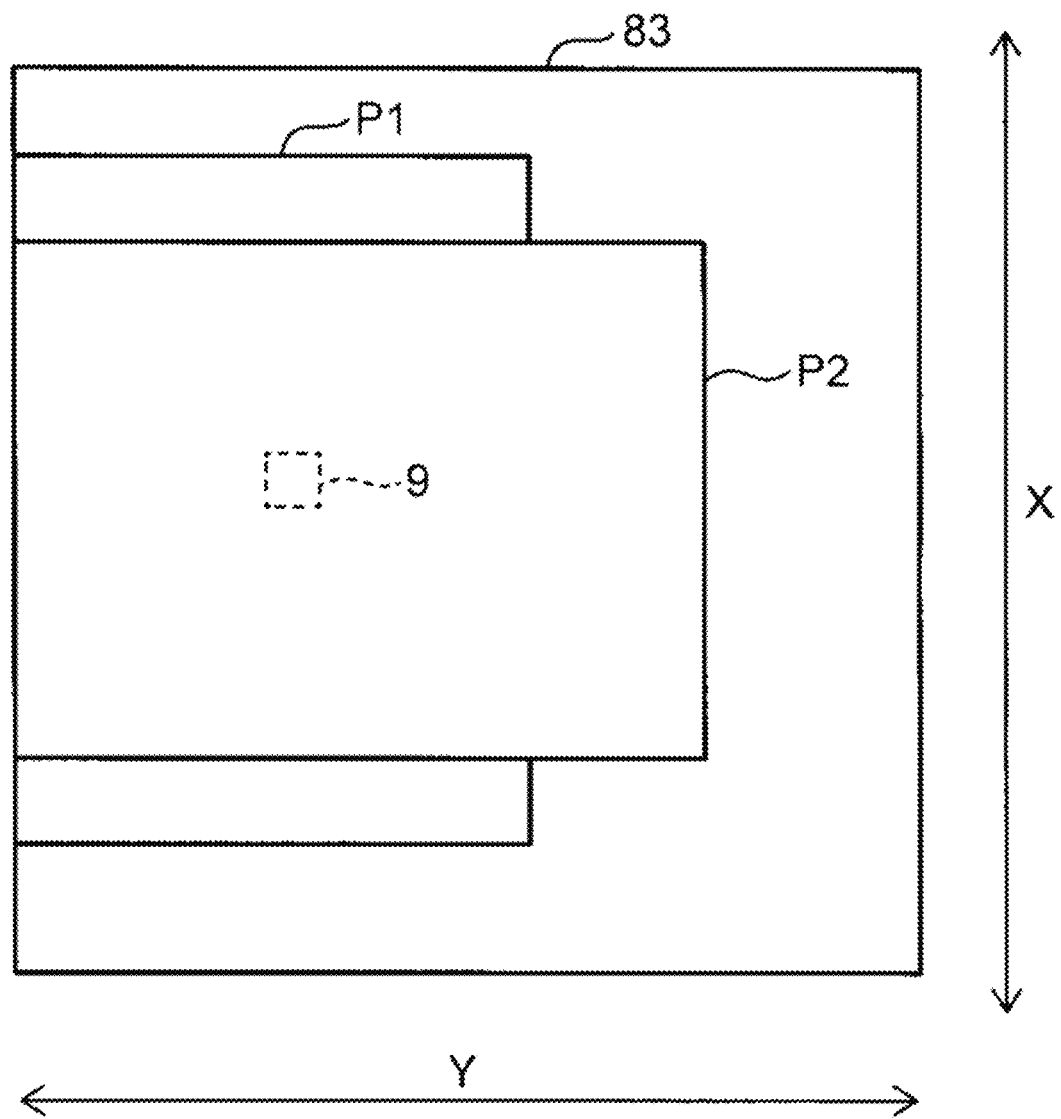
FIG. 4 is a view showing one example of the arrangement of a sheet discharge detecting sensor.

FIG. 4 is a view showing one example of the arrangement of the sheet discharge detecting sensor 9. In FIG. 4, the X direction corresponds to a direction perpendicular to the drawing sheet surface of FIG. 2, and the Y direction corresponds to a left-right direction of the drawing sheet surface of FIG. 2. In the following description, the X direction indicates the longitudinal direction, and the Y direction indicates the transverse direction. As shown in FIG. 4, the sheet discharge detecting sensor 9 is provided near the center of the bottom surface of the discharge tray 83. Accordingly, as set forth later, the sheet discharge detecting sensor 9 can detect that the sheet is placed on the discharge tray 83, regardless of which of a sheet P1 discharged in a portrait orientation (with the longitudinal side of the sheet extending in the X direction) and a sheet P2 discharged in a landscape orientation (with the longitudinal side of the sheet extending in the Y direction) is placed on the discharge tray 83.

The sheet discharge detecting sensor 9 is not limited to the reflection-type photo sensor. For example, the sheet discharge detecting sensor 9 may be a mechanical sensor which includes a protrusion biased upward by a spring or the like and which detects that the sheet is placed on the discharge tray 83, if the protrusion makes contact with the sheet and moves downward.

The control unit 10 controls the overall operation of the multifunction peripheral 1. The control unit 10 includes, e.g., a CPU (Central Processing Unit) for executing a predetermined arithmetic processing, a nonvolatile memory, such as an EEPROM (Electrically Erasable and Programmable Read Only Memory) or the like, for storing a predetermined control program, a RAM (Random Access Memory) for temporarily storing a data, and peripheral circuits thereof.

By causing the CPU to execute the control program stored in the nonvolatile memory, the control unit 10 forms an authenticating unit 11, a job accepting unit 12, a print control unit 13, a job display processing unit 14 and a sheet discharge status display unit 15, which are indicated by solid lines in FIG. 3.

The authenticating unit 11 determines whether a user is previously authorized to use the multifunction peripheral 1. A combination of a user name of a user who is previously authorized to use the multifunction peripheral 1 and a password is pre-stored in the nonvolatile memory. If a combination of a user name and a password inputted by operating the operation key unit 32 coincides with the combination of the user name and the password stored in the nonvolatile memory, the authenticating unit 11 determines that the user who performs the input operation is previously authorized to use the multifunction peripheral 1. On the other hand, if the combination of the user name and the password inputted by operating the operation key unit 32 does not coincide with the combination of the user name and the password stored in the nonvolatile memory, the authenticating unit 11 determines that the user who performs the input operation is not previously authorized to use the multifunction peripheral 1.

The method of determining through the use of the authenticating unit 11 whether a user is previously authorized to use the multifunction peripheral 1 is not limited to the aforementioned method. For example, a card reader capable of reading user information from an IC card which stores user information including a user name may be installed in the multifunction peripheral 1. In addition, the authenticating unit 11 may perform the aforementioned determination depending on whether the user name included in the user information read from the IC card with the card reader coincides with the user name pre-stored in the nonvolatile memory.

The job accepting unit 12 accepts a print job for the multifunction peripheral 1. More specifically, if a print job is inputted by the operation key unit 32, the job accepting unit 12 accepts the inputted print job. If the communication unit 7 receives a print job for the multifunction peripheral 1 transmitted by the computer EC, the job accepting unit 12 accepts the print job thus received.

The print job is a job in which an image is formed on a sheet by the image forming unit 4 and in which the image-formed sheet is discharged to the discharge tray 83 by the discharge unit 8. The print job contains, e.g., a user name of a user who has inputted the print job, different kinds of print conditions such as an instruction, which indicates whether to form an image on one surface of the sheet or to form images on the opposite surfaces of the sheet, the number of print copies or the like, and a target image to be formed on the sheet. Furthermore, the print job contains additional information such as sheet discharge direction information which indicates the orientation of the sheet when the image-formed sheet is discharged, sheet discharge face information which indicates whether to discharge the image-formed sheet in a face-up state or to discharge the image-formed sheet in a face-down state, priority information which indicates the priority order in which to execute the print job, or the like.

If print jobs are accepted by the job accepting unit 12, the print control unit 13 executes the print jobs in the accepted order. That is to say, the execution order of the print jobs is identical with the acceptance order of the print jobs accepted by the job accepting unit 12. However, the execution order of the print jobs is not limited to the acceptance order of the print jobs. For example, the print control unit 13 may execute a print job which contains priority information, prior to a print job which does not contain priority information.

In case of executing a print job, based on the contents of the print job, the print control unit 13 causes the image forming unit 4 to form an image on the sheet and causes the discharge unit 8 to discharge the image-formed sheet to the discharge tray 83.

For example, it is assumed that the print job contain a print condition which indicates that an image is formed on one surface of the sheet, sheet discharge direction information which indicates that the sheet is discharged in a landscape orientation, and sheet discharge face information which indicates that the sheet is discharged in a face-up state.

In this case, based on the sheet discharge direction information, the print control unit 13 conveys a sheet from one of the sheet feeding cassettes 461 accommodating sheets in a landscape orientation to the image forming unit 4. Then, based on the print condition, the print control unit 13 causes the image forming unit 4 to form an image on the front side of the sheet. Thereafter, based on the sheet discharge face information, the print control unit 13 discharges the sheet in a face-up state by causing the inverting roller 81 to switch back the image-formed sheet and causing the discharge roller 82 to discharge the sheet to the discharge tray 83 in a face-up state.

As another example, it is assumed that the print job contains a print condition which indicates that an image is formed on one surface of the sheet but does not contain sheet discharge direction information and sheet discharge face information.

In this case, the print control unit 13 conveys a sheet from one of the sheet feeding cassettes 461 accommodating sheets in one predetermined orientation of a portrait orientation and a landscape orientation to the image forming unit 4. The predetermined orientation is initially set in advance using the operation key unit 32 and is stored in the nonvolatile memory. In the following description, it is assumed that the predetermined orientation is a portrait orientation.

Then, the print control unit 13 causes the image forming unit 4 to form an image on the front side of the sheet. Thereafter, the print control unit 13 causes the discharge roller 82 to discharge the sheet conveyed from the image forming unit 4 to the discharge tray 83 in one predetermined state of a face-up state and a face-down state. The predetermined state is initially set in advance using the operation key unit 32 and is stored in the nonvolatile memory. In the following description, it is assumed that the predetermined state is a face-down state.

The job display processing unit 14 executes a job display processing by which, among the print jobs accepted by the job accepting unit 12, the print jobs under execution and prior to execution are arranged side by side in an execution or and are displayed on the display unit 31. In the job display processing, the job display processing unit 14 identifiably displays the contents of the print job inputted by an authenticated user who is determined by the authenticating unit 11 to be a user who is previously authorized to use the multifunction peripheral 1. On the other hand, in the job display processing, the job display processing unit 14 unidentifiably displays the contents of the print jobs inputted by users other than the authenticated user.

If it is detected by the sheet discharge detecting sensor 9 that the sheet is placed on the discharge tray 83, the sheet discharge status display unit 15 causes the display unit 31 to display a sheet discharge image which indicates that the discharged sheet is placed on the discharge tray 83.

Details of the job display processing unit 14 and the sheet discharge status display unit 15 will now be described. FIGS. 5 to 10 are views each showing one example of the contents displayed on the display unit 31 by the job display processing unit 14 and the sheet discharge status display unit 15.

In the following description, it is assumed that the job accepting unit 12 accepts seven print jobs. It is also assumed that the print control unit 13 begins to execute the firstly accepted print job at 16:22. It is further assumed that a user "USER A" is determined at 16:22 by the authenticating unit 11 to be a user who is previously authorized to use the multifunction peripheral 1. It is additionally assumed that the print job inputted by the user "USER A" is a fourthly accepted print job among the seven print jobs and is accepted at 16:21. The seven print jobs are indicated by print jobs J1 to J7 according to the execution order (acceptance order) thereof.

If it is determined at 16:22 by the authenticating unit 11 that the user "USER A" is previously authorized to use the multifunction peripheral 1, the job display processing unit 14 begins to execute a job display processing. In the job display processing, the job display processing unit 14 causes the display unit 31 to display, in the execution order, the contents of three firstly, secondly and thirdly accepted print jobs J1 to J3 under execution and prior to execution, among the seven print jobs J1 to J7 accepted by the job accepting unit 12.

In this regard, the print jobs J1 to J3 are print jobs inputted by users other than the authenticated user (the user "USER A") who is determined by the authenticating unit 11 to have prior authorization to use the multifunction peripheral 1. The job display processing unit 14 causes the display unit 31 to unidentifiably display the contents of the print jobs J1 to J3 inputted by other users.

Figure 5:
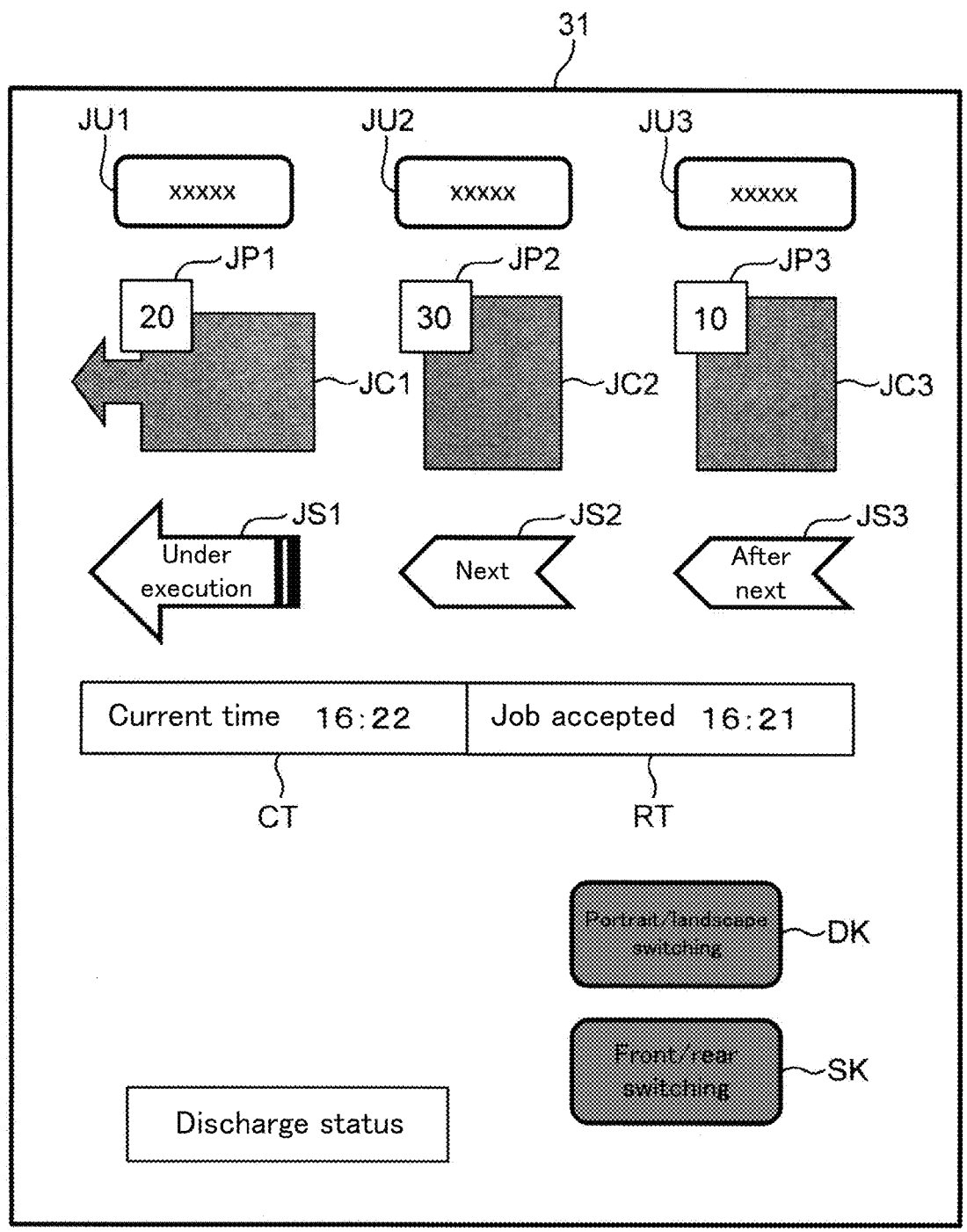
FIG. 5 is a view showing a first example of the contents displayed on a display unit by a job display processing unit and a sheet discharge status display unit.

More specifically, as shown in FIG. 5, the job display processing unit 14 unidentifiably displays the user names JU1 to JU3 of the users who have inputted the respective print jobs J1 to J3, which are contained in the respective print jobs J1 to J3. By stating that the job display processing unit 14 unidentifiably displays the user names JU1 to JU3, it is meant that the user names JU1 to JU3 are made unidentifiable by displaying predetermined character strings "xxxxx" which do not show the user names JU1 to JU3 instead of displaying character strings which show the user names JU1 to JU3.

Furthermore, the job display processing unit 14 generates thumbnail images JC1 to JC3 indicating the target images to be initially formed on the sheets, among the target images which are contained in the respective print jobs J1 to J3 and which are to be formed on the sheets. Since the print jobs J1 to J3 are inputted by other users, the job display processing unit 14 unidentifiably displays the thumbnail images JC1 to JC3 thus generated. By stating that the job display processing unit 14 unidentifiably displays the thumbnail images JC1 to JC3, it is meant that the contents of the thumbnail images JC1 to JC3 are made unidentifiable by displaying predetermined images (images painted in a gray color in FIG. 5) which do not show the thumbnail images JC1 to JC3 instead of displaying the thumbnail images JC1 to JC3.

At this time, the job display processing unit 14 displays the respective thumbnail images JC1 to JC3 in conformity with the sheet orientation indicated by the sheet discharge direction information contained in the respective print jobs J1 to J3. For example, it is assumed that the print job J1 contains the sheet discharge direction information which indicates that the sheet is discharged in a landscape orientation and further that the print jobs J2 and J3 contain the sheet discharge direction information which indicates that the sheet is discharged in a portrait orientation. In this case, as shown in FIG. 5, the job display processing unit 14 displays the thumbnail image JC1 in a landscape orientation and displays the thumbnail images JC2 and JC3 in a portrait orientation. If the print jobs do not contain any sheet discharge direction information, the job display processing unit 14 displays thumbnail images corresponding to the print jobs in the aforementioned predetermined orientation (the portrait orientation in the present description).

Moreover, the job display processing unit 14 calculates the numbers JP1 to JP3 of the sheets discharged through the execution of the respective print jobs J1 to J3 (hereinafter referred to as the discharge sheet numbers JP1 to JP3) by multiplying the number of target images which are contained in the respective print jobs J1 to J3 and which are to be formed on the sheets, and the number of print copies. Then, the job display processing unit 14 displays the discharge sheet numbers JP1 to JP3 in an overlapping relationship with the thumbnail images JC1 to JC3. As one example, FIG. 5 shows that the discharge sheet numbers JP1 to JP3 calculated by the job display processing unit 14 are "20", "30" and "10", respectively.

At 16:22, the print control unit 13 starts the execution of the print job J1. Therefore, in the job display processing, the job display processing unit 14 displays an image JS1 which indicates that the relevant print job is under execution (the information which indicates that the relevant print job is under execution) below a region where the contents of the print job J1 under execution, such as the user name JU1 and the thumbnail image JC1, are displayed. In this way, during the job display processing, the job display processing unit 14 displays the contents of the print job J1 under execution and the image JS1 which indicates that the relevant print job J1 is under execution, in a mutually associated relationship.

Furthermore, the job display processing unit 14 displays an image JS2 which indicates that the relevant print job is prior to execution and is to be executed next (the information which indicates that the relevant print job is prior to execution) below a region where the contents of the print job J2 prior to execution, such as the user name JU2 and the thumbnail image JC2, are displayed.

Similarly, the job display processing unit 14 displays an image JS3 which indicates that the relevant print job is prior to execution and is to be executed after the next (the information which indicates that the relevant print job is prior to execution) below a region where the contents of the print job J3 prior to execution, such as the user name JU3 and the thumbnail image JC3, are displayed.

In this way, during the job display processing, the job display processing unit 14 displays the contents of the print jobs J2 and J3 prior to execution and the images JS2 and JS3 which indicate that the relevant print jobs J2 and J3 are prior to execution, in a mutually associated relationship.

The job display processing unit 14 causes the display unit 31 to display a soft key DK for performing a touch operation to switch the orientation of the sheet discharged through the execution of the print job inputted by an authenticated user. Furthermore, the job display processing unit 14 causes the display unit 31 to display a soft key SK for performing a touch operation to switch the face-up-state discharge and the face-down-state discharge of the sheet on which an image is formed through the execution of the print job inputted by an authenticated user.

If the contents of a print job J4 inputted by an authenticated user (a user "USER A") are not displayed on the display unit 31, the job display processing unit 14 displays the soft key DK and the soft key SK in a touch-operation-impossible manner. By stating that the job display processing unit 14 displays the soft key DK and the soft key SK in a touch-operation-impossible manner, it is meant that the soft key DK and the soft key SK are displayed in a display mode differing from the display mode in which the soft key DK and the soft key SK can be touch-operated (for example, the soft key DK and the soft key SK are displayed in a gray color as shown in FIG. 5) and further that a touch operation is not accepted by the control unit 10 even if the soft key DK and the soft key SK are touch-operated.

In addition, the job display processing unit 14 causes the display unit 31 to display the current time CT and the acceptance time RT of the print job J4 inputted by the authenticated user (the user "USER A").

At 16:22, the execution of the print job J1 is stated and the image-formed sheet is not yet discharged to the discharge tray 83. In other words, the sheet discharge detecting sensor 9 detects that the sheet is not placed on the discharge tray 83. If the sheet discharge detecting sensor 9 detects that the sheet is not placed on the discharge tray 83, the sheet discharge status display unit 15 does not display a sheet discharge image on the display unit 31.

Thereafter, the execution of the print job J1 is finished. It is assumed that the current time is 16:23. It is also assumed that the execution of the print job J2 is started by the print control unit 13.

Figure 6:
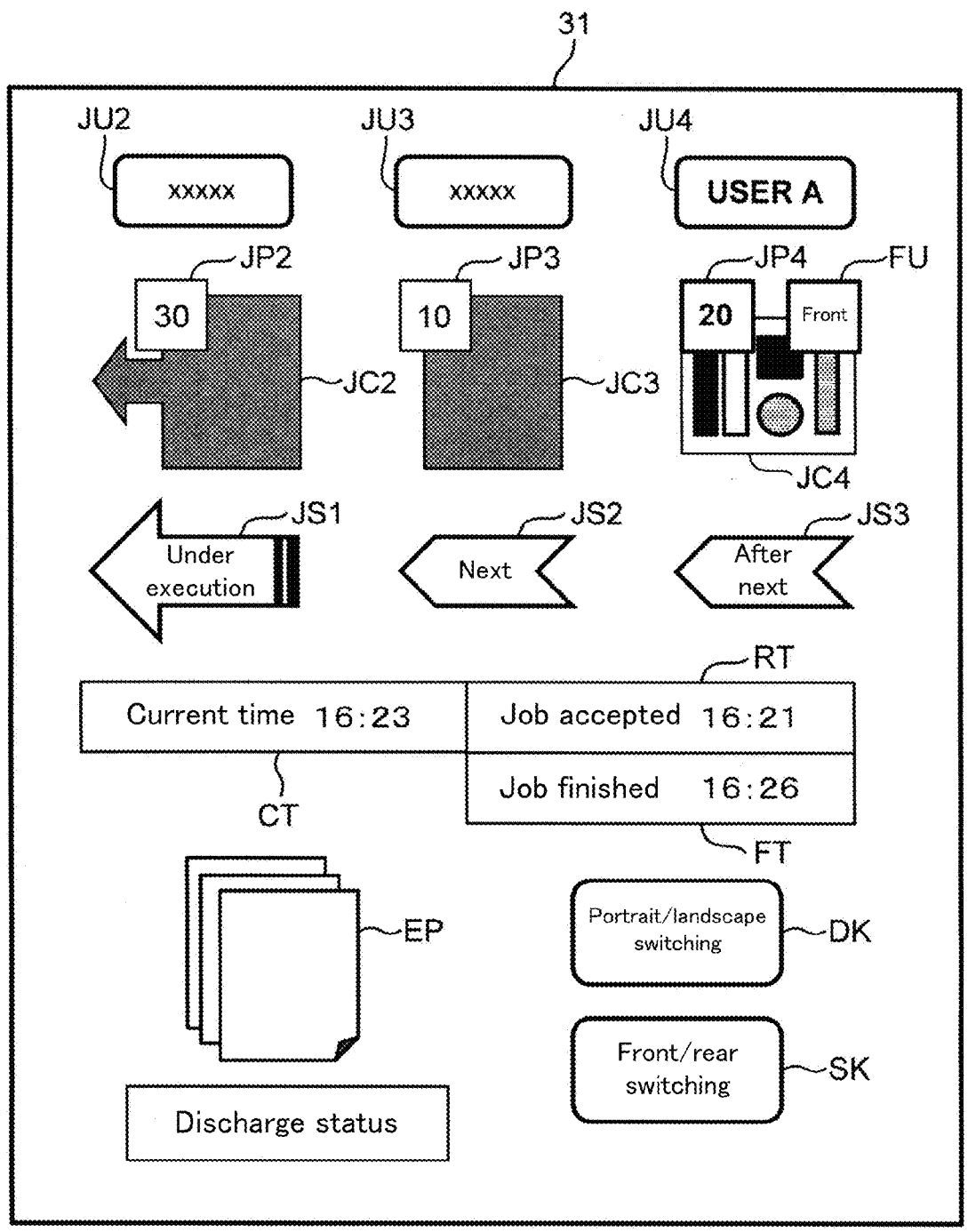
FIG. 6 is a view showing a second example of the contents displayed on the display unit by the job display processing unit and the sheet discharge status display unit.

In this case, as shown in FIG. 6, the job display processing unit 14 does not display the contents of the print job J1 whose execution is finished and displays the contents of three print jobs J2 to J4 under execution and prior to execution on the display unit 31 in an execution order.

At this time, as is the case when the current time is 16:22 (FIG. 5), the job display processing unit 14 causes the display unit 31 to unidentifiably display the contents of the print jobs J2 and J3 inputted by other users. More specifically, as shown in FIG. 6, the job display processing unit 14 unidentifiably displays the user names JU2 and JU3 and the thumbnail images JC2 and JC3 and displays the previously-calculated discharge sheet numbers JP2 and JP3 in an overlapping relationship with the thumbnail images JC2 and JC3.

Since the execution of the print job J2 is started, the job display processing unit 14 displays the contents of the print job J2 under execution and the image JS1 which indicates that the print job J2 is under execution, in a mutually associated relationship. Furthermore, the job display processing unit 14 displays the contents of the print job J3 prior to execution and the image JS2 which indicates that the print job J3 is prior to execution and is to be executed next, in a mutually associated relationship.

On the other hand, the job display processing unit 14 causes the display unit 31 to identifiably display the contents of the print job J4 inputted by the authenticated user (the user "USER A"). More specifically, the job display processing unit 14 identifiably displays the user name JU4 of the user who has inputted the print job J4, which is contained in the print job J4. By stating that the job display processing unit 14 identifiably displays the user name JU4, it is meant that the user name JU4 is made identifiable by, e.g., displaying a character string "USER A" which indicates the user name JU4.

Furthermore, the job display processing unit 14 generates a thumbnail image JC4 indicating the target image to be initially formed on the sheet, among the target images which are contained in the print job J4 and which are to be formed on the sheet. Then, the job display processing unit 14 identifiably displays the thumbnail image JC4 thus generated. By stating that the job display processing unit 14 identifiably displays the thumbnail image JC4, it is meant that the contents of the thumbnail image JC4 are made identifiable by displaying the thumbnail image JC4.

At this time, the job display processing unit 14 displays the thumbnail image JC4 in conformity with the sheet orientation indicated by the sheet discharge direction information contained in the print job J4.

Figure 7:
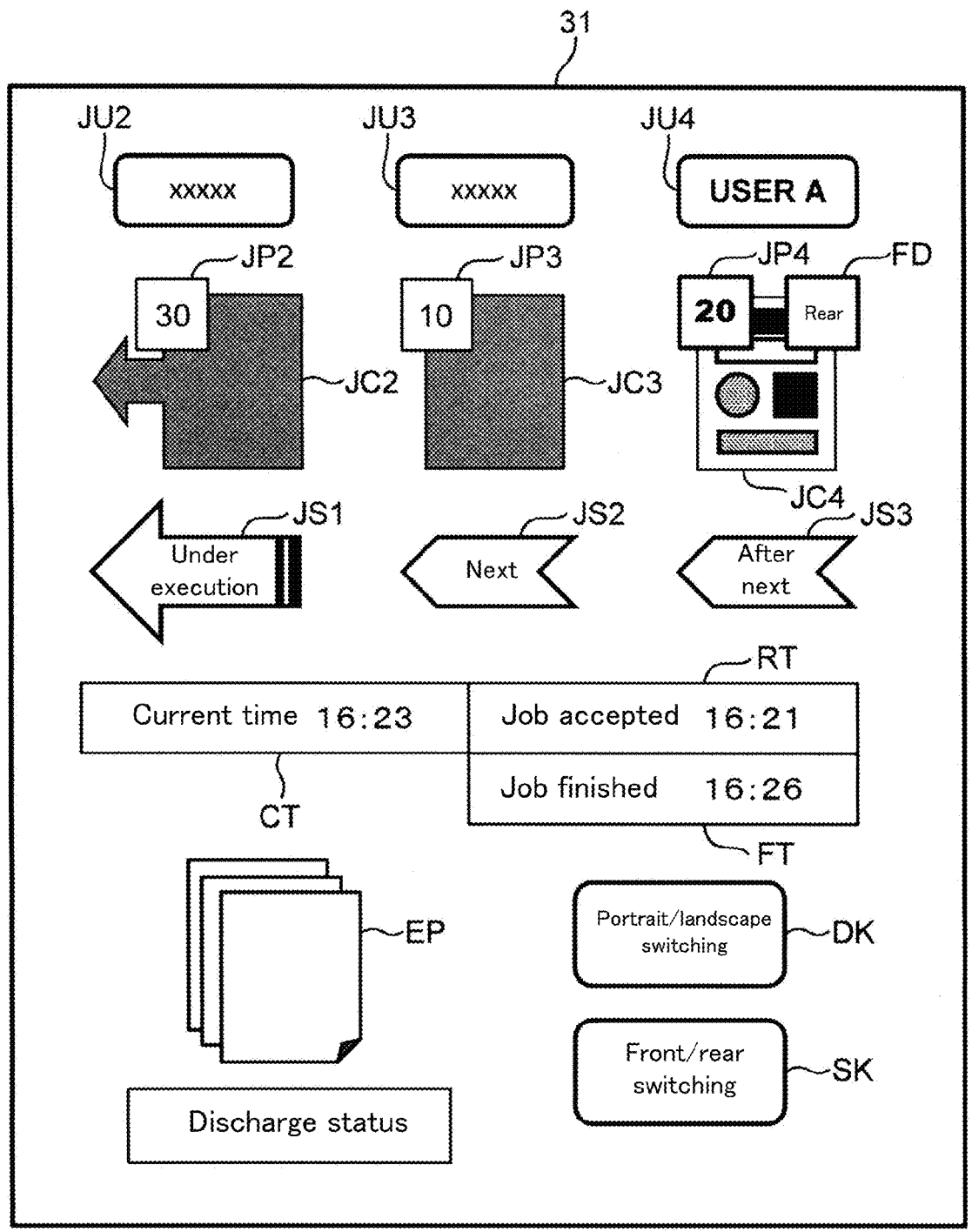
FIG. 7 is a view showing a third example of the contents displayed on the display unit by the job display processing unit and the sheet discharge status display unit.

For example, it is assumed that the print job J4 contains the sheet discharge direction information which indicates that the sheet is discharged in a landscape orientation. In this case, as shown in FIG. 6, the job display processing unit 14 displays the thumbnail image JC4 in a landscape orientation based on the sheet discharge direction information. On the other hand, it is assumed that the print job J4 contains the sheet discharge direction information which indicates that the sheet is discharged in a portrait orientation. In this case, as shown in FIG. 7, the job display processing unit 14 displays the thumbnail image JC4 in a portrait orientation based on the sheet discharge direction information. If the print job J4 do not contain any sheet discharge direction information, the job display processing unit 14 displays the thumbnail image JC4 in the aforementioned predetermined orientation (the portrait orientation in the present description).

Based on the sheet discharge face information contained in the print job J4 inputted by the authenticated user, the job display processing unit 14 displays the contents of the print job J4 and the information indicating the face-up-state discharge or the face-down-state discharge of the sheet on which an image is formed through the execution of the print job J4, in a mutually associated relationship.

For example, it is assumed that the print job J4 contains sheet discharge face information which indicates that the sheet is discharged in a face-up state. In this case, as shown in FIG. 6, based on the sheet discharge face information, the job display processing unit 14 displays the information which indicates that the sheet is discharged in a face-up state, namely an image FU which indicates that the upper surface is the front side of the sheet, in an overlapping relationship with the thumbnail image JC4. In this way, the job display processing unit 14 displays the contents of the print job J4 and the information which indicates that the sheet is discharged in a face-up state, in a mutually associated relationship.

On the other hand, it is assumed that the print job J4 contains sheet discharge face information which indicates that the sheet is discharged in a face-down state. In this case, as shown in FIG. 7, based on the sheet discharge face information, the job display processing unit 14 displays the information which indicates that the sheet is discharged in a face-down state, namely an image FD which indicates that the upper surface is the rear side of the sheet, in an overlapping relationship with the thumbnail image JC4. In this way, the job display processing unit 14 displays the contents of the print job J4 and the information which indicates that the sheet is discharged in a face-down state, in a mutually associated relationship.

If the print job J4 does not contain any sheet discharge face information, the job display processing unit 14 displays an image corresponding to the aforementioned predetermined state, namely one of the image FU which indicates that the upper surface is the front side of the sheet and the image FD which indicates that the upper surface is the rear side of the sheet, in an overlapping relationship with the thumbnail image JC4 (In the present description, the job display processing unit 14 displays the image FD which indicates that the upper surface is the rear side of the sheet, because the face-down state is set as the aforementioned predetermined state).

The method of displaying the contents of the print job J4 and the information indicating the face-up-state discharge or the face-down-state discharge of the sheet in a mutually associated relationship is not limited to the specific example shown in FIGS. 6 and 7.

For example, in case of displaying the contents of the print job J4 and the information indicating the face-down-state discharge of the sheet in a mutually associated relationship, the job display processing unit 14 may display an image obtained by inverting the front and rear sides of the thumbnail image JC4, instead of the thumbnail image JC4. In case of displaying the contents of the print job J4 and the information indicating the face-up-state discharge of the sheet in a mutually associated relationship, the job display processing unit 14 may display the thumbnail image JC4 as it stands, without inverting the front and rear sides of the thumbnail image JC4.

Moreover, the job display processing unit 14 calculates the number JP4 of the sheets discharged through the execution of the print job J4 by multiplying the number of target images which are contained in the print job J4 and which are to be formed on the sheets, and the number of print copies. Then, the job display processing unit 14 displays the discharge sheet number JP4 in an overlapping relationship with the thumbnail image JC4. For example, FIGS. 6 and 7 show that the discharge sheet number JP4 calculated by the job display processing unit 14 is "20".

Then, the job display processing unit 14 displays an image JS3 which indicates that the relevant print job is prior to execution and is to be executed after the next, below a region where the contents of the print job J4 prior to execution, such as the user name JU4 and the thumbnail image JC4, are displayed. In this way, during the job display processing, the job display processing unit 14 displays the contents of the print job J4 prior to execution and the image JS3 which indicates that the relevant print job J4 is prior to execution, in a mutually associated relationship.

In addition, the job display processing unit 14 multiplies the total sum of the discharge sheet numbers JP2 and JP4 and the unit print time. The unit print time is the time required in executing a print job for forming an image on one sheet and is predetermined by an experimental value obtained through a test operation, etc. That is to say, the multiplication result corresponds to the time required in executing the print jobs J2 to J4. Then, the job display processing unit 14 displays the time elapsed from the current time CT by the time indicated by the multiplication result, as the finishing time FT of the print job J4.

For example, it is assumed that the unit print time is 3 seconds. In the specific example shown in FIGS. 6 and 7, the total sum of the discharge sheet numbers JP2 to JP4 is 60. In this case, the job display processing unit 14 displays, as the finishing time FT of the print job J4, the time "16:26" elapsed from the current time CT "16:23" at which the execution of the print job J2 is started, by the time "3 minutes (=60×3 seconds) indicated by the multiplication result of the total sum of the discharge sheet numbers JP2 to JP4 and the unit print time.

If the contents of the print job J4 inputted by the authenticated user (the user "USER A") are displayed on the display unit 31, the job display processing unit 14 displays the soft key DK and the soft key SK in a touch-operation-possible manner. By stating that the job display processing unit 14 displays the soft key DK and the soft key SK in a touch-operation-possible manner, it is meant that the soft key DK and the soft key SK are displayed in a display mode differing from the display mode in which the soft key DK and the soft key SK cannot be touch-operated (for example, the soft key DK and the soft key SK are not displayed in a gray color as shown in FIG. 6) and further that a touch operation is accepted by the control unit 10 if the soft key DK and the soft key SK are touch-operated.

For example, as shown in FIG. 6, it is assumed that the soft key DK is touch-operated in a state in which the thumbnail image JC4 is displayed in the landscape orientation. In this case, the job display processing unit 14 changes the orientation of only the thumbnail image JC4 of the print job J4 inputted by the authenticated user (the user "USER A") from the landscape orientation to the portrait orientation and displays the thumbnail image JC4 in the portrait orientation. Furthermore, the job display processing unit 14 changes the orientation of the sheet indicated by the sheet discharge direction information contained in the print job J4 to the portrait orientation. If the print job J4 does not contain the sheet discharge direction information, the job display processing unit 14 causes the print job J4 to newly contain the sheet discharge direction information which indicates that the sheet is discharged in the portrait orientation.

On the other hand, as shown in FIG. 7, it is assumed that the soft key DK is touch-operated in a state in which the thumbnail image JC4 is displayed in the portrait orientation. In this case, the job display processing unit 14 changes the orientation of only the thumbnail image JC4 of the print job J4 inputted by the authenticated user (the user "USER A") from the portrait orientation to the landscape orientation and displays the thumbnail image JC4 in the landscape orientation. Furthermore, the job display processing unit 14 changes the orientation of the sheet indicated by the sheet discharge direction information contained in the print job J4 to the landscape orientation. If the print job J4 does not contain the sheet discharge direction information, the job display processing unit 14 causes the print job J4 to newly contain the sheet discharge direction information which indicates that the sheet is discharged in the landscape orientation.

In this way, if the soft key DK is touch-operated, the orientation of the sheet indicated by the sheet discharge direction information contained only in the print job J4 inputted by the authenticated user (the user "USER A") is switched.

For example, it is assumed that, as shown in FIG. 6, the soft key SK is touch-operated in a state in which the image FU, which indicates that the upper surface is the front side of the sheet, is displayed in an overlapping relationship with the thumbnail image JC4. In other words, it is assumed that the soft key SK is touch-operated in a state in which the contents of the print job J4 inputted by the authenticated user (the user "USER A") and the information indicating the face-up-state discharge of the sheet are displayed in a mutually associated relationship.

In this case, the job display processing unit 14 displays the image FD which indicates that the upper surface is the rear side of the sheet, rather than the image FU which indicates that the upper surface is the front side of the sheet, in an overlapping relationship with the thumbnail image JC4. In other words, the job display processing unit 14 displays the contents of the print job J4 and the information which indicates the face-down-state discharge of the sheet, in a mutually associated relationship. In addition, the job display processing unit 14 changes the sheet discharge state, which is indicated by the sheet discharge face information contained in the print job J4 inputted by the authenticated user (the user "USER A"), to the face-down state. If the print job J4 inputted by the authenticated user (the user "USER A") does not contain any sheet discharge face information, the job display processing unit 14 causes the print job J4 to newly contain the sheet discharge face information which indicates that the sheet is discharged in the face-down state.

On the other hand, for example, it is assumed that, as shown in FIG. 7, the soft key SK is touch-operated in a state in which the image FD, which indicates that the upper surface is the rear side of the sheet, is displayed in an overlapping relationship with the thumbnail image JC4. In other words, it is assumed that the soft key SK is touch-operated in a state in which the contents of the print job J4 inputted by the authenticated user (the user "USER A") and the information indicating the face-down-state discharge of the sheet are displayed in a mutually associated relationship.

In this case, the job display processing unit 14 displays the image FU which indicates that the upper surface is the front side of the sheet, rather than the image FD which indicates that the upper surface is the rear side of the sheet, in an overlapping relationship with the thumbnail image JC4. In other words, the job display processing unit 14 displays the contents of the print job J4 and the information which indicates the face-up-state discharge of the sheet, in a mutually associated relationship. In addition, the job display processing unit 14 changes the sheet discharge state, which is indicated by the sheet discharge face information contained in the print job J4 inputted by the authenticated user (the user "USER A"), to the face-up state. If the print job J4 inputted by the authenticated user (the user "USER A") does not contain any sheet discharge face information, the job display processing unit 14 causes the print job J4 to newly contain the sheet discharge face information which indicates that the sheet is discharged in the face-up state.

In this way, if the soft key SK is touch-operated, just like the operation of the soft key DK, the face-up-state discharge of the sheet or the face-down-state discharge of the sheet indicated by the sheet discharge face information contained only in the print job J4 inputted by the authenticated user (the user "USER A") is switched.

The execution of the print job J1 is finished at 16:23. In this regard, it is assumed that the sheet discharged through the execution of the print job J1 is not picked up but is directly placed on the discharge tray 83. In this case, the sheet discharge detecting sensor 9 detects that the sheet is placed on the discharge tray 83. If the placing of the sheet on the discharge tray 83 is detected by the sheet discharge detecting sensor 9, the sheet discharge status display unit 15 displays a sheet discharge image EP on the display unit 31 as shown in FIGS. 6 and 7.

Thereafter, the execution of the print jobs J2 and J3 is finished. It is assumed that the current time is 16:25. It is also assumed that the execution of the print job J4 is started by the print control unit 13.

Figure 8:
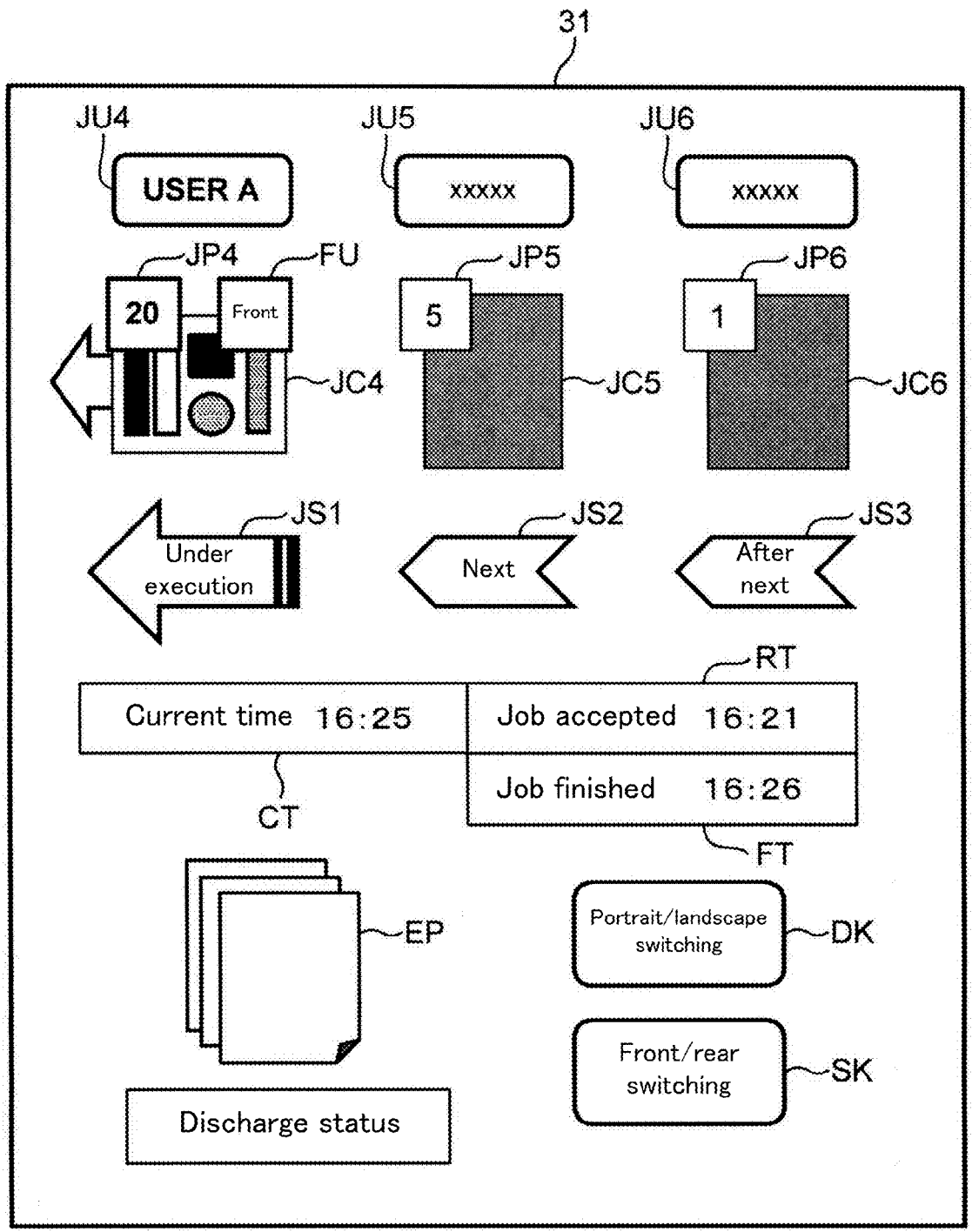
FIG. 8 is a view showing a fourth example of the contents displayed on the display unit by the job display processing unit and the sheet discharge status display unit.

In this case, as shown in FIG. 8, the job display processing unit 14 does not display the contents of the print jobs J2 and J3 whose execution is finished and displays the contents of three print jobs J4 to J6 under execution and prior to execution on the display unit 31 in an execution order.

At this time, as is the case when the current time is 16:23 (FIGS. 6 and 7), the job display processing unit 14 causes the display unit 31 to identifiably display the contents of the print job J4 inputted by the authenticated user. On the other hand, the job display processing unit 14 causes the display unit 31 to unidentifiably display the contents of the print jobs J5 and J6 inputted by other users. Moreover, the job display processing unit 14 displays the calculated discharge sheet numbers JP4 to JP6 in an overlapping relationship with the thumbnail images JC4 and JC6.

Since the execution of the print job J4 is started, the job display processing unit 14 displays the contents of the print job J4 under execution and the image JS1 which indicates that the print job J4 is under execution, in a mutually associated relationship. Furthermore, the job display processing unit 14 displays the contents of the print jobs J5 and J6 prior to execution and the images JS2 and JS3 which indicate that the print jobs J5 and J6 are prior to execution, in a mutually associated relationship.

It is assumed that, at 16:25, the sheets discharged through the execution of the print jobs J1 to J3 are not picked up but are directly placed on the discharge tray 83. In this case, the placing of the sheets on the discharge tray 83 is detected by the sheet discharge detecting sensor 9. Therefore, as shown in FIG. 8, the sheet discharge status display unit 15 displays a sheet discharge image EP on the display unit 31. Thus, in this case, the authenticated user can grasp that the sheet discharged through the execution of the print job J4 inputted by the authenticated user is stacked above the sheets already placed on the discharge tray 83.

Figure 9:
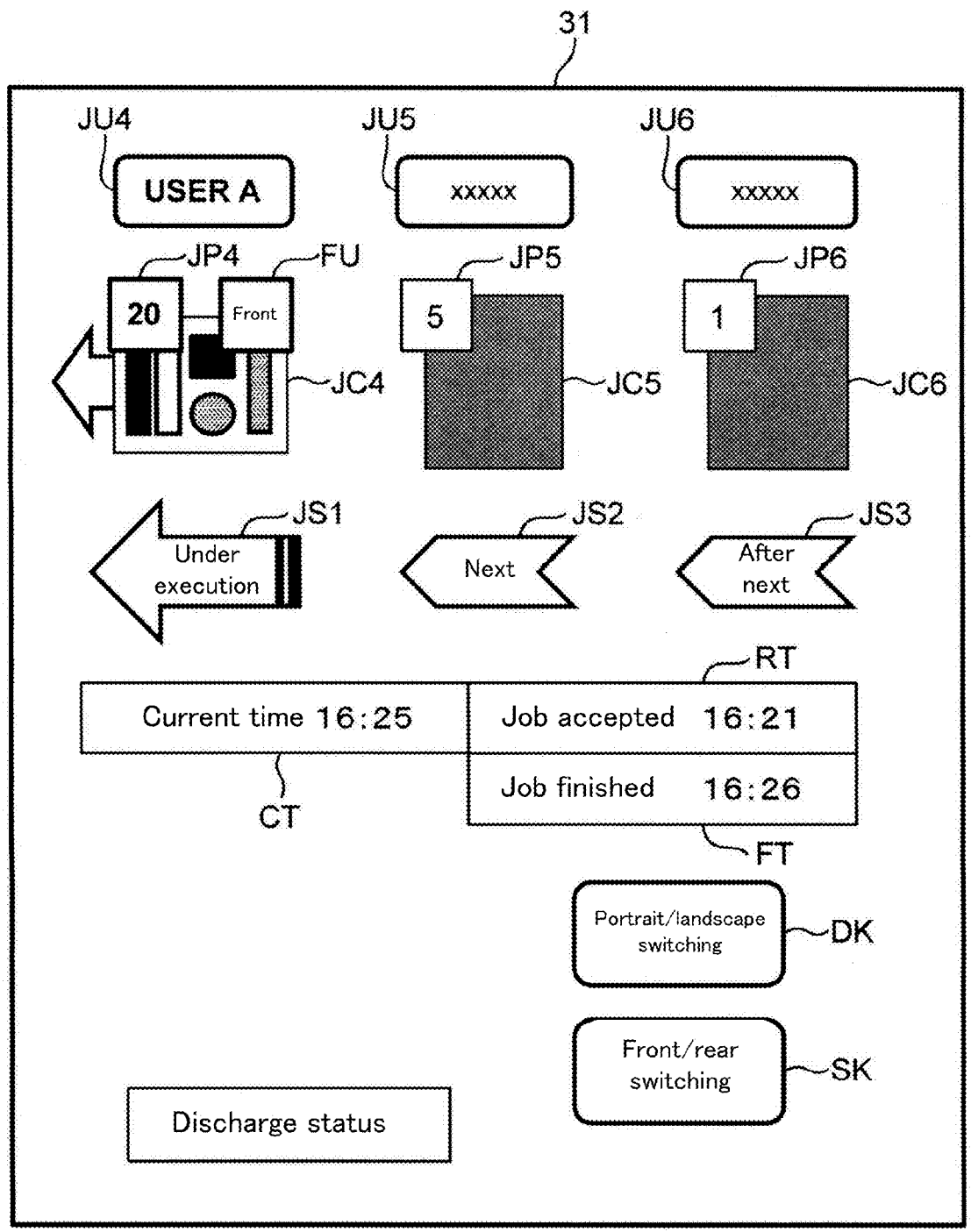
FIG. 9 is a view showing a fifth example of the contents displayed on the display unit by the job display processing unit and the sheet discharge status display unit.

On the other hand, it is assumed that, at 16:25, the sheets discharged through the execution of the print jobs J1 to J3 are previously picked up and are not placed on the discharge tray 83. In this case, the placing of the sheets on the discharge tray 83 is not detected by the sheet discharge detecting sensor 9. Therefore, as shown in FIG. 9, the sheet discharge status display unit 15 does not display a sheet discharge image EP on the display unit 31. Thus, even if the sheets discharged through the execution of other print jobs are subsequently stacked on the discharge tray 83, the authenticated user can grasp that the sheet discharged through the execution of the print job J4 inputted by the authenticated user exists at the lowermost position on the discharge tray 83.

Thereafter, the execution of the print job J4 is finished. It is assumed that the current time is 16:26. It is also assumed that the execution of the print job J5 is started by the print control unit 13.

Figure 10:
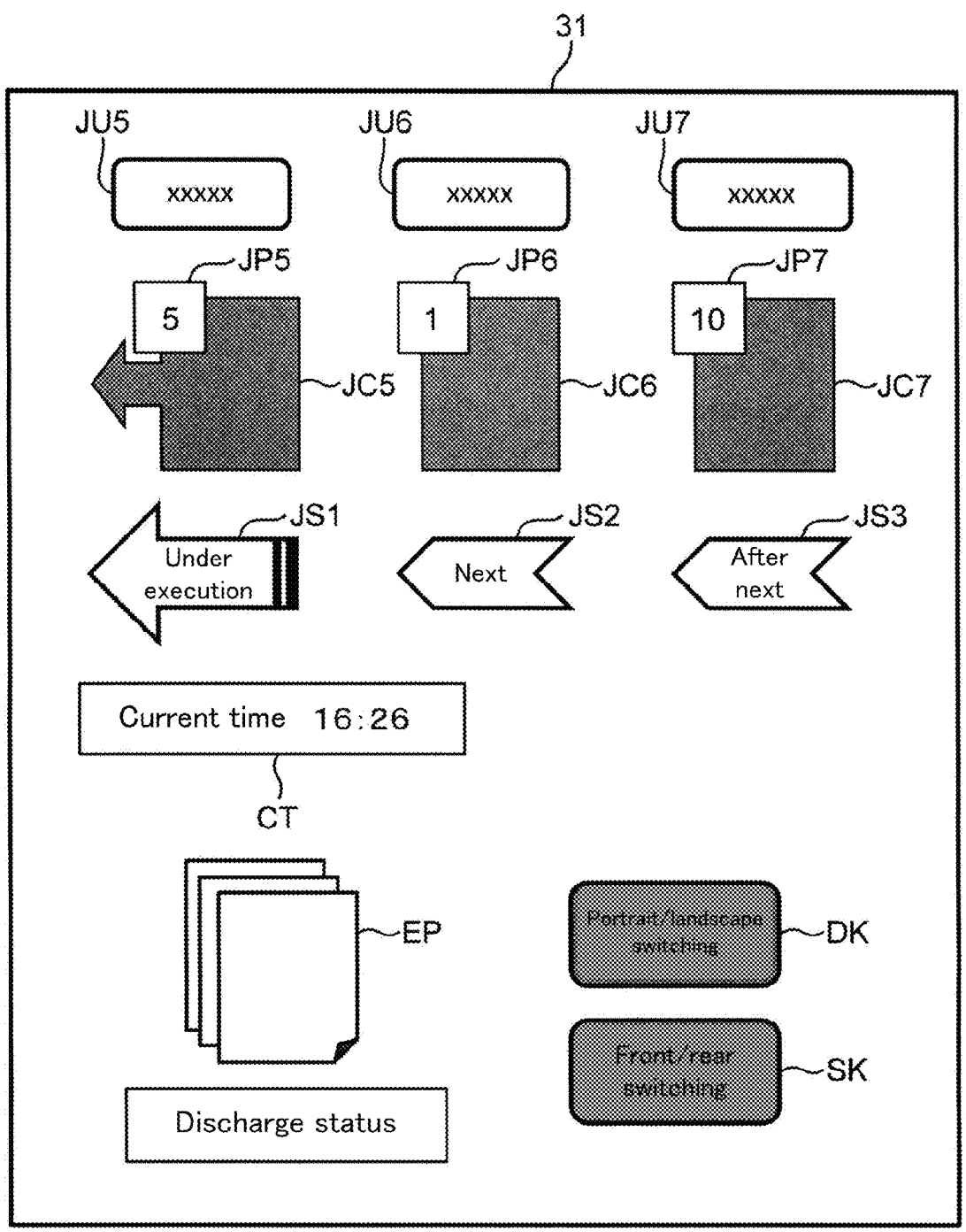
FIG. 10 is a view showing a sixth example of the contents displayed on the display unit by the job display processing unit and the sheet discharge status display unit.

In this case, as shown in FIG. 10, the job display processing unit 14 does not display the contents of the print job J4 whose execution is finished. Since the execution of the print job J4 inputted by the authenticated user has been finished, the job display processing unit 14 does not display the acceptance time RT of the print job J4 and the finishing time FT of the print job J4, and displays the soft key DK and the soft key SK in a touch-operation-impossible manner.

The job display processing unit 14 displays the contents of three print jobs J5 to J7 under execution and prior to execution on the display unit 31 in an execution order. At this time, as is the case when the current time is 16:22 (FIG. 5), the job display processing unit 14 causes the display unit 31 to unidentifiably display the contents of the print jobs J5 to J7 inputted by other user. Moreover, the job display processing unit 14 displays the calculated discharge sheet numbers JP5 to JP7 in an overlapping relationship with the thumbnail images JC5 and JC7.

Since the execution of the print job J5 is started, the job display processing unit 14 displays the contents of the print job J5 under execution and the image JS1 which indicates that the print job J5 is under execution, in a mutually associated relationship. Furthermore, the job display processing unit 14 displays the contents of the print jobs J6 and J7 prior to execution and the images JS2 and JS3 which indicate that the print jobs J6 and J7 are prior to execution, in a mutually associated relationship.

It is assumed that, at 16:26, the sheet discharged through the execution of the print job J4 is not picked up but is directly placed on the discharge tray 83. In this case, the placing of the sheet on the discharge tray 83 is detected by the sheet discharge detecting sensor 9. Therefore, as shown in FIG. 10, the sheet discharge status display unit 15 displays a sheet discharge image EP on the display unit 31. Thus, in this case, the authenticated user can grasp that the sheets subsequently discharged through the execution of the print jobs J5 and J7 are stacked above the sheet discharged through the execution of the print job J4 inputted by the authenticated user.

As described above, according to the configuration of the aforementioned embodiment, the contents of the print job J4 inputted by the authenticated user among the contents of the print jobs under execution and prior to execution are identifiably displayed. However, the contents of the print jobs J1 to J3 and J5 to J7 inputted by users other than the authenticated user are unidentifiably displayed. For that reason, the authenticated user cannot identify the contents of the print jobs J1 to J3 and J5 to J7 inputted by other users. It is therefore possible to reduce the possibility that the contents of the print jobs J1 to J3 and J5 to J7 inputted by users other than the authenticated user are leaked to the authenticated user. In other words, it is possible to reduce the possibility that the contents of a print job are leaked to users other than the user who has inputted the relevant print job.

According to the configuration of the aforementioned embodiment, the authenticated user can easily grasp whether the print job J4 inputted by the authenticated user is under execution or prior to execution, by visually recognizing the image JS1 indicating that the print job is under execution or the images JS2 and JS3 indicating that the print jobs are prior to execution, which is displayed in an associated relationship with the contents of the print job J4 inputted by the authenticated user.

According to the configuration of the aforementioned embodiment, if the contents of the print job J4 under execution or prior to execution which are inputted by the authenticated user are displayed on the display unit 31 and if the sheet discharge image EP is displayed on the display unit 31, the authenticated user can grasp that the sheet discharged through the execution of the print job J4 inputted by the authenticated user is stacked at an upper position rather than a lowermost position on the discharge tray 83.

Thus, when picking up the sheet discharged through the execution of the print job J4 inputted by the authenticated user from the sheets stacked on the discharge tray 83, the authenticated user can limit the pick-up target sheet to the sheet stacked at an upper position on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

According to the configuration of the aforementioned embodiment, the authenticated user can grasp the orientation of the sheet discharged through the execution of the print job J4 inputted by the authenticated user, by visually recognizing the thumbnail image JC4 and grasping the displayed orientation of the thumbnail image JC4.

Thus, when picking up the sheet discharged through the execution of the print job J4 inputted by the authenticated user from the sheets stacked on the discharge tray 83, the authenticated user can limit the pick-up target sheet to the sheet placed in the grasped orientation among the sheets stacked on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

According to the configuration of the aforementioned embodiment, the authenticated user can change the orientation of the sheet discharged through the execution of the print job J4 inputted by the authenticated user, by operating the soft key DK.

Thus, when picking up the sheet discharged through the execution of the print job J4 inputted by the authenticated user from the sheets stacked on the discharge tray 83, the authenticated user can limit the pick-up target sheet to the sheet placed in the changed orientation among the sheets stacked on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

According to the configuration of the aforementioned embodiment, the authenticated user can grasp whether the sheet discharged through the execution of the print job J4 inputted by the authenticated user will be discharged in a face-up state or in a face-down state, by visually recognizing the image FU indicating that the upper surface is the front side of the sheet or the image FD indicating that the upper surface is the rear side of the sheet, which is displayed in an associated relationship with the contents of the print job J4 inputted by the authenticated user.

Thus, when picking up the sheet discharged through the execution of the print job J4 inputted by the authenticated user from the sheets stacked on the discharge tray 83, the authenticated user can limit the pick-up target sheet to the sheet placed in the grasped state among the sheets stacked on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

According to the configuration of the aforementioned embodiment, the authenticated user can decide the face-up-state discharge or the face-down-state discharge of the sheet discharged through the execution of the print job J4 inputted by the authenticated user, by operating the soft key SK.

Thus, when picking up the sheet discharged through the execution of the print job J4 inputted by the authenticated user from the sheets stacked on the discharge tray 83, the authenticated user can limit the pick-up target sheet to the sheet placed in the changed state among the sheets stacked on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

The configurations shown in FIGS. 1 to 10 are nothing more than illustrative examples of the technology of the present disclosure and are not intended to limit the technology of the present disclosure to the embodiment described above.

(1) For example, the job management device according to the technology of the present disclosure may be applied to the computer EC. More specifically, the computer EC may be provided with the same processing units as the authenticating unit 11, the job display processing unit 14, the sheet discharge status display unit 15 and the placing direction detecting unit 16. In addition, the control unit 10 of the multifunction peripheral 1 may transmit the detection signal inputted from the sheet discharge detecting sensor 9 to the computer EC via the communication unit 7. Moreover, the computer EC may be further provided with a placing detection unit which detects, based on the detection signal received from the multifunction peripheral 1, whether the sheet discharged through the execution of the print job is placed on the discharge tray 83 of the multifunction peripheral 1.

The control unit 10 of the multifunction peripheral 1 may transmit the contents of the print jobs under execution and prior to execution among the print jobs accepted by the job accepting unit 12, to the computer EC. Using the contents of the print jobs under execution and prior to execution which are received from the multifunction peripheral 1, the processing units of the computer EC identical with the job display processing unit 14 and the sheet discharge status display unit 15 may display the contents, which are identical with the contents displayed on the display unit 31 by the job display processing unit 14 and the sheet discharge status display unit 15 described in the aforementioned embodiment, on the display unit of the computer EC.

Figure 11:
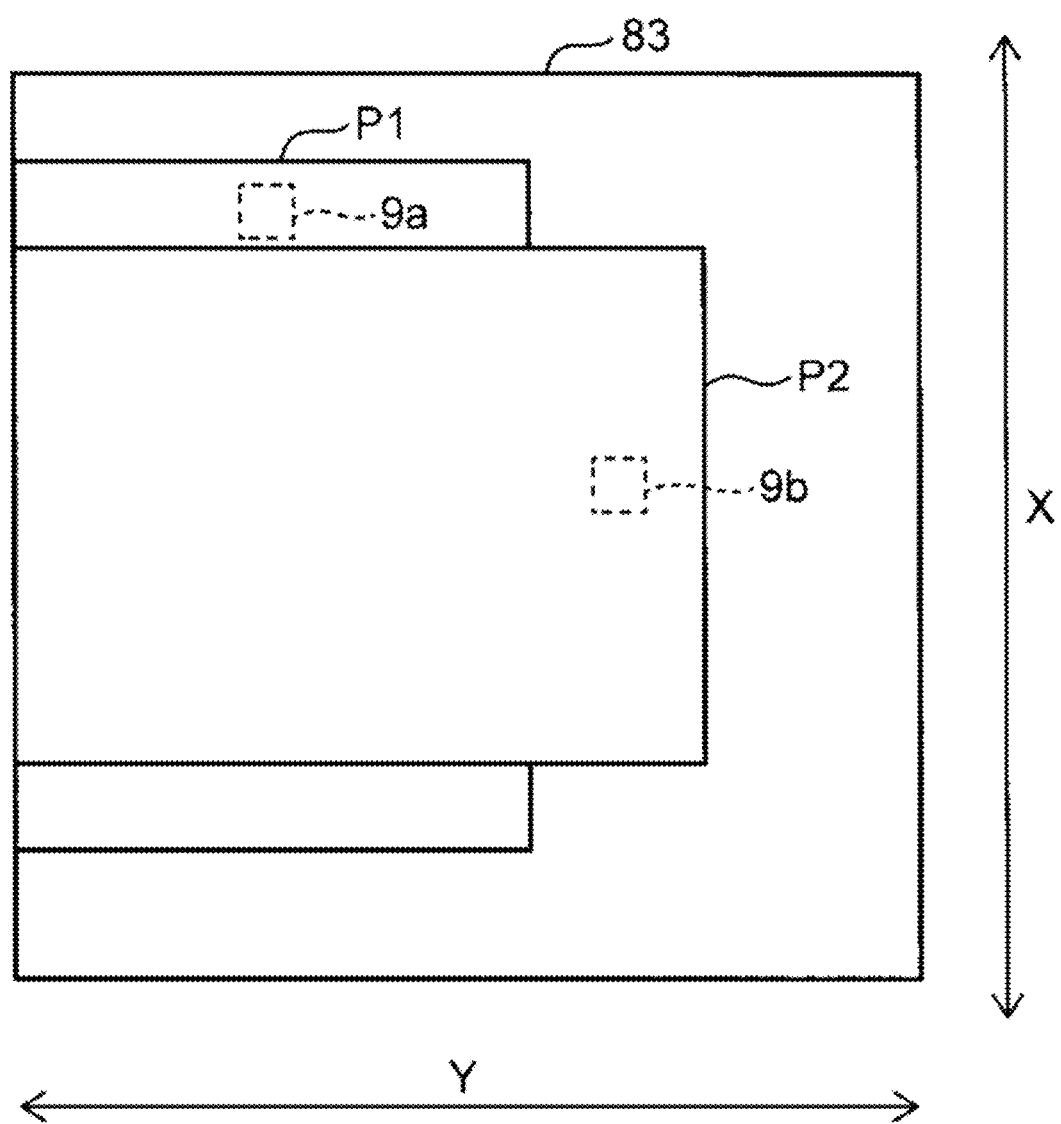
FIG. 11 is a view showing another example of the arrangement of a sheet discharge detecting sensor, which differs from that shown in FIG. 4.

(2) Instead of the sheet discharge detecting sensor 9 shown in FIG. 4, two sheet discharge detecting sensors 9a and 9b may be installed in the discharge tray 83 as shown in FIG. 11. Just like the sheet discharge detecting sensor 9 shown in FIG. 4, each of the sheet discharge detecting sensors 9a and 9b may be configured by a reflection-type photo sensor provided with a light emitting element or a light receiving element or a mechanical sensor. The sheet discharge detecting sensor 9a detects whether the sheet P1 discharged in a portrait orientation is stacked on the discharge tray 83. The sheet discharge detecting sensor 9b detects whether the sheet P2 discharged in a landscape orientation is stacked on the discharge tray 83.

In addition, the control unit 10 may form the placing direction detecting unit 16 indicated by a broken line in FIG. 3, by causing the CPU to execute the control program stored in the nonvolatile memory.

If the sheet discharge detecting sensor 9a precedes the sheet discharge detecting sensor 9b in detecting that the sheet P1 discharged in a portrait orientation is stacked on the discharge tray 83, the placing direction detecting unit 16 detects that the orientation of the sheet stacked on the discharge tray 83 is the portrait orientation. On the other hand, if the sheet discharge detecting sensor 9b precedes the sheet discharge detecting sensor 9a in detecting that the sheet P2 discharged in a landscape orientation is stacked on the discharge tray 83, the placing direction detecting unit 16 detects that the orientation of the sheet stacked on the discharge tray 83 is the landscape orientation.

Figure 12:
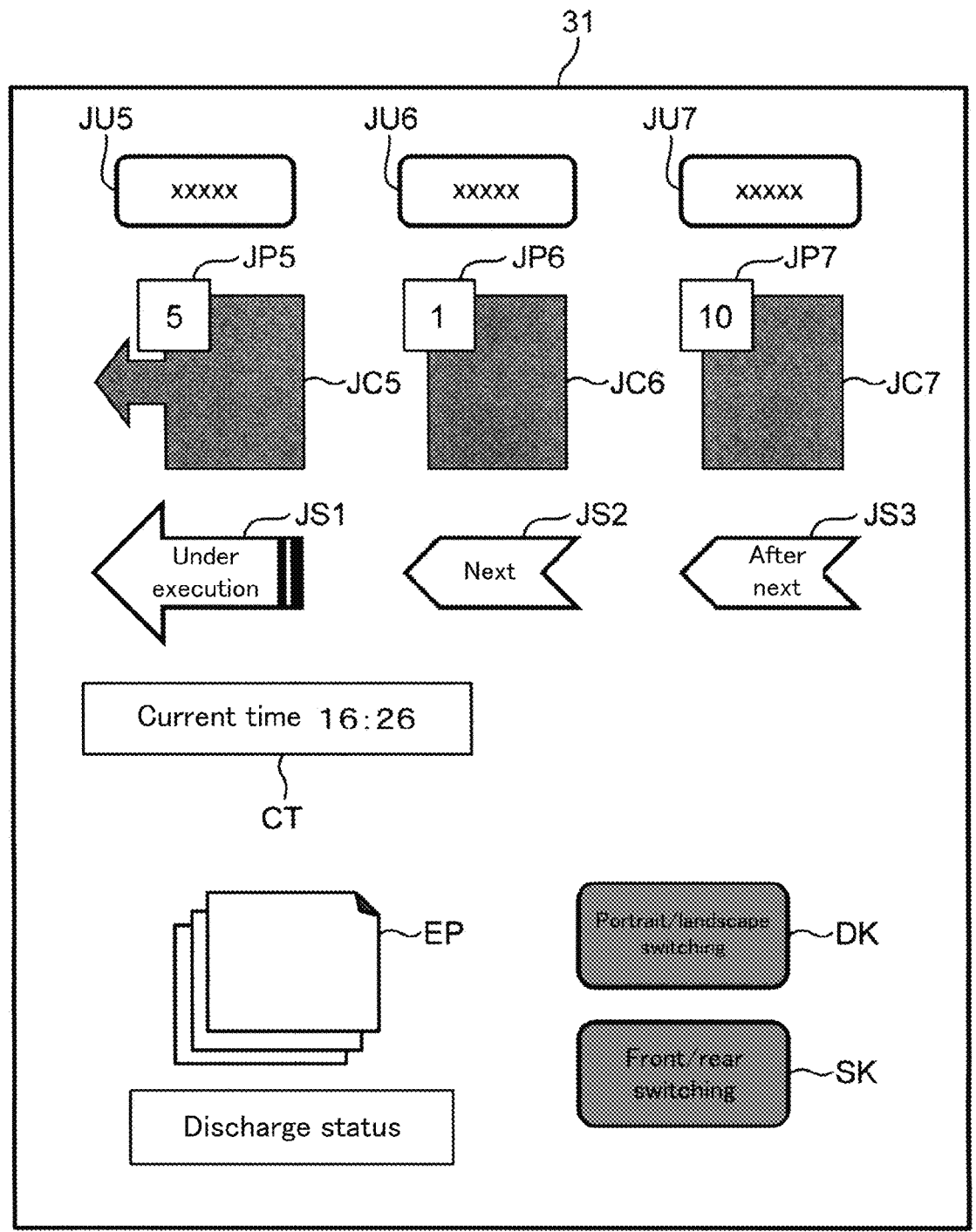
FIG. 12 is a view showing a seventh example of the contents displayed on the display unit by the job display processing unit and the sheet discharge status display unit.

In addition, in case of displaying a sheet discharge image EP, the sheet discharge status display unit 15 may display the sheet discharge image EP in conformity with the orientation of the sheet detected by the placing direction detecting unit 16. For example, it is assumed that the placing direction detecting unit 16 has detected that the orientation of the sheet placed on the discharge tray 83 is the portrait orientation. In this case, the sheet discharge status display unit 15 displays the sheet discharge image EP in the portrait orientation as shown in FIG. 10. On the other hand, it is assumed that the placing direction detecting unit 16 has detected that the orientation of the sheet placed on the discharge tray 83 is the landscape orientation. In this case, the sheet discharge status display unit 15 displays the sheet discharge image EP in the landscape orientation as shown in FIG. 12.

In this configuration, regardless of which of the sheet discharge detecting sensors 9a and 9b has first detected that the sheet is placed on the discharge tray 83, when the sheet discharge detecting sensor 9a has detected that the sheet P1 is stacked on the discharge tray 83, the placing direction detecting unit 16 may detect that the orientation of the sheet placed on the discharge tray 83 is the portrait orientation. When the sheet discharge detecting sensor 9b has detected that the sheet P2 is stacked on the discharge tray 83, the placing direction detecting unit 16 may detect that the orientation of the sheet placed on the discharge tray 83 is the landscape orientation. In addition, each time when the placing direction detecting unit 16 detects the orientation of the sheet placed on the discharge tray 83, the sheet discharge status display unit 15 may display the sheet discharge image EP in conformity with the detected orientation of the sheet.

According to this configuration, if the contents of the print job J4 prior to execution which are inputted by the authenticated user are displayed on the display unit 31 and if the sheet discharge image EP is displayed on the display unit 31, when the orientation of the sheet discharged through the execution of the print job J4 inputted by the authenticated user is identical with the orientation of the sheet already stacked on the discharge tray 83, the authenticated user may operate the soft key DK to change the orientation of the sheet so that the sheet can be stacked in the orientation differing from the orientation of the sheet discharge image EP.

Thus, when picking up the sheet discharged through the execution of the print job J4 inputted by the authenticated user from the sheets stacked on the discharge tray 83, the authenticated user can limit the pick-up target sheet to the sheet stacked in an orientation differing from the orientation of the sheet discharge image EP among the sheets staked on the discharge tray 83. As a result, it is possible to reduce the time and effort required in picking up the sheet discharged through the execution of the print job J4 inputted by the authenticated user from the sheets stacked on the discharge tray 83. It is also possible to reduce a mistake of picking up the sheets of other users instead of the sheet of the authenticated user. This makes it possible to reduce the possibility that, due to the mistake in picking up the sheet, the contents of the print job are leaked to users other than the user who has inputted the relevant print job.

(3) The job management device may be simplified such that the job display processing unit 14 does not display at least one of the soft key DK and the soft key SK.

(4) The job management device may be simplified such that, based on the sheet discharge face information contained in the print job, the job display processing unit 14 do not display the contents of the print job and the information indicating the face-up-state discharge of the sheet or the face-down-state discharge of the sheet in a mutually associated relationship.

(5) The job management device may be simplified such that, regardless of the orientation of the sheet indicated by the sheet discharge direction information contained in the contents of the print job, the job display processing unit 14 displays the thumbnail image in the aforementioned predetermined orientation.

(6) The job management device may be simplified such that the control unit 10 does not form the sheet discharge status display unit 15.

(7) The job management device may be simplified such that the job display processing unit 14 does not display the image JS1 which indicates that the print job is under execution and the images JS2 and JS3 which indicate that the print jobs are prior to execution.

The job management device according to the technology of the present disclosure can be applied to not only the aforementioned multifunction peripheral 1 but also other image forming apparatuses capable of executing a print job, such as a printer apparatus, a facsimile apparatus and the like.

What is claimed is:

1. A job management device, comprising:
  a display unit configured to display information;
  an authenticating unit configured to determine whether a user is previously authorized to use an image forming apparatus; and
  a job display processing unit configured to execute a job display processing by which the contents of print jobs under execution and prior to execution among print jobs accepted by the image forming apparatus are arranged in an execution order and displayed on the display unit, the job display processing unit configured to, in the job display processing, identifiably display the contents of a print job inputted by an authenticated user who is determined by the authenticating unit to have prior authorization to use the image forming apparatus and unidentifiably display the contents of the print jobs inputted by users other than the authenticated user.

2. The job management device of claim 1, wherein, in the job display processing, the job display processing unit is configured to display the contents of the print job under execution and the information which indicates that the print job is under execution, in a mutually associated relationship, and to display the contents of the print job prior to execution and the information which indicates that the print job is prior to execution, in a mutually associated relationship.

3. The job management device of claim 1, further comprising:
  a placing detection unit configured to detect whether a sheet discharged through the execution of the print job is placed on a discharge tray; and
  a sheet discharge status display unit configured to, if the placing of the sheet on the discharge tray is detected by the placing detection unit, cause the display unit to display a sheet discharge image which indicates that the discharged sheet is placed on the discharge tray.

4. The job management device of claim 3, further comprising:
  a placing direction detecting unit configured to detect an orientation of the sheet placed on the discharge tray,
  wherein the sheet discharge status display unit is configured to, in case of displaying the sheet discharge image, display the sheet discharge image in conformity with the orientation of the sheet detected by the placing direction detecting unit.

5. The job management device of claim 1, wherein the print job contains sheet discharge direction information which indicates an orientation of a sheet discharged through the execution of the print job and a target image which is to be formed on the sheet through the execution of the print job, and
  wherein, in the job display processing, the job display processing unit is configured to display a thumbnail image indicating the target image contained in the print job, in conformity with the orientation of the sheet indicated by the sheet discharge direction information contained in the print job.

6. The job management device of claim 5, wherein the job display processing unit is configured to further display a soft key for performing an operation of switching the orientation of the sheet indicated by the sheet discharge direction information.

7. The job management device of claim 1, wherein the print job contains sheet discharge face information which indicates whether a sheet having an image formed through the execution of the print job is discharged in a face-up state in which a front side of the sheet faces upward or in a face-down state in which the front side of the sheet faces downward, and
  wherein, in the job display processing, the job display processing unit is configured to, based on the sheet discharge face information contained in the print job, display the contents of the print job and the information which indicates that the sheet having the image formed through the execution of the print job is discharged in the face-up state or the information which indicates that the sheet having the image formed through the execution of the print job is discharged in the face-down state, in a mutually associated relationship.

8. The job management device of claim 7, wherein the job display processing unit is configured to further display a soft key for performing an operation of switching a face-up-state discharge of the sheet or a face-down-state discharge of the sheet, which is indicated by the sheet discharge face information.

* * * * *